(12) United States Patent
Asselin et al.

(10) Patent No.: US 7,886,285 B2
(45) Date of Patent: Feb. 8, 2011

(54) COMBINING SOFTWARE EXECUTABLE LIBRARIES

(75) Inventors: Albert Andre Asselin, Holly Springs, NC (US); Fred Allison Bower, III, Durham, NC (US); David Bryan Roberts, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1304 days.

(21) Appl. No.: 11/375,312

(22) Filed: Mar. 14, 2006

(65) Prior Publication Data

US 2007/0220502 A1 Sep. 20, 2007

(51) Int. Cl.
 *G06F 9/44* (2006.01)
(52) U.S. Cl. ..................... 717/163; 717/167
(58) Field of Classification Search .......... 717/162–167
 See application file for complete search history.

(56) References Cited

U.S. PATENT DOCUMENTS

| 5,761,510 | A  | 6/1998  | Smith, Jr. et al. ........... 395/704 |
| 5,919,247 | A  | 7/1999  | Van Hoff et al. ............ 709/217 |
| 5,974,470 | A  | 10/1999 | Hammond .................. 709/305 |
| 5,987,471 | A  | 11/1999 | Bodine et al. ................ 707/103 |
| 6,049,671 | A  | 4/2000  | Slivka et al. ................. 395/712 |
| 6,408,403 | B1 | 6/2002  | Rodrigues et al. ............. 714/38 |
| 6,745,048 | B2 | 6/2004  | Vargas et al. ................ 455/558 |
| 6,779,187 | B1 | 8/2004  | Hammond ................... 719/331 |

OTHER PUBLICATIONS

Klaus Marquardt, "Physical Patterns", 1998, Lubeck Germany, 22 pages.*
Blume, "CM—The SML/NJ Compilation and Library Manager—User Manual", May 2002, Lucent Technology, Bell Labs, pp. 1-59.*
Sun Microsystems, "Plug-In API Programming Guide—Sun™ One Directory Server", Jun. 2003, Version 5.2, 214 pages.*
IBM Technical Disclosure Bulletin, "Method for Switching DFT DLC without Stopping 3270 Emulation Session", vol. 32, No. 11, Apr. 1990, pp. 127-128.

* cited by examiner

*Primary Examiner*—Ted T Vo
(74) *Attorney, Agent, or Firm*—Cynthia G. Seal; Law Office of Jim Boice

(57) ABSTRACT

The present invention provides a method, data processing system and computer program product in which a plurality of software executable libraries (sub-libraries) are combined into a single software executable library. The single library comprises a plurality of register functions, each associated with a particular sub-library and each sub-library comprises one or more functions. When the library receives a request to register from a library manager it calls each of the register functions, each of which register the one or more functions of its associated sub-library with the library manager. Advantageously the library manager can subsequently interface with each sub-library as if the sub-library was a standalone library. Further a register function can be used for a library whether the library is sub-library or a standalone library, thereby reducing the effort to switch from one to the other.

18 Claims, 5 Drawing Sheets

COMBINING SOFTWARE EXECUTABLE LIBRARIES

BACKGROUND TO THE INVENTION

1. Field of the Invention

The present inventions relates to software executable libraries/sub-libraries of functions and more particularly to the processing of a library which comprises a plurality of sub-libraries.

2. Background to the Invention

A well known and widely used method of providing software functions to a software application installed on a computer system is to provide an appropriate library which contains the executable software functions. The software application links to the library in order to discover/resolve the locations within the library of the various executable routines/methods which it provides to perform the software functions. The application may then call the resolved/discovered routines/methods.

Libraries may be either statically or dynamically linked to an application executable file. In static linking the application executable file includes a linked instance of the library, whereas in dynamic linking the application executable file links to a separate instance of the library at load time. Comparing the two methods, static linking has an advantage in that the application executable file will load relatively faster because the library does not need to be linked at load time, but has disadvantages in that it increases the size of the application executable file and further the library instance included in the application executable file is not sharable by other applications. Dynamic linking has advantages in that the application executable file is relatively smaller and the instance of the library which is linked can be shared by other applications, but it has a disadvantage in that it slows down application load because the library must be linked at application load time.

A library which is dynamically linkable may be referred to as a dynamic link library or dll and there are different ways in which such a library can be linked. For example a standard way of dynamically linking a dll is where the application executable file includes calls to specific functions/routines of a named dll library, which it wishes to call. The calls are specified such that they must be resolved at either load time or at some point during run time by loading the named dll. As a result the named dll must be available to be loaded when required by the application executable or the application will fail. Further, for example, the application executable is limited to using the named dll for the specific functions/routines.

For example, another way of dynamically linking is through provision of a plug-in dll. A plug-in dll provides a standard method which may be called in order to initialize the plug-in dll and obtain/discover details of the methods/routines which the plug-in dll provides. Accordingly, for plug-in dlls, for example, the application (or more typically a plug-in manger which is used by the application) looks for the presence of plug-in dlls in a specified location of the computer system on which the application is loaded. If such a dll is found the application/plug-in manager calls the standard method of the dll to obtain details of the routines/methods which it provides. These routines/methods are then made available for calling by the application executable. An advantage of using plug-in dlls is the plug-in based architecture allows for tailoring of the functionality of the application via the addition or removal of plug-in dlls. For example, the addition or removal of a plug-in dll can happen after the product which provides the plug-in dll has been installed. The characteristic of a plug-in dll which makes this possible is the standard method which each plug-in dll provides and which may be called to discover the other methods/routines which the plug-in dll provides.

Accordingly providers of software products which provide software services to applications may provide such products in the form of one or more dlls. However, the size of a dll is variable and accordingly a decision must be made as to how many dlls to use in order provide a product. For example, an advantage of providing a product as many small dlls, when compared to a single large dll, is that it makes it easier to provide fixes/and or updates to products because only the affected dll need be replaced. Conversely, for example, disadvantages are that each dll incurs the overhead associated with being loaded at runtime and further each dll incurs a storage overhead making, for example, a product supplied as many dlls larger than the same product as a single dll. For example, for plug-in dlls each plug-in dll must contain a standard method which can be used to initialize it and obtain details of the methods/routines which the plug-in dll provides, and a proportion of the code in the method is common amongst all plug-ins. As a result the common code is reproduced once for each plug-in dll and this adds to overall the size of a product.

Accordingly there becomes a trade-off between maintainability and storage space required for a product and often an optimal solution is not possible. Further because a change to/from a single dll from/to a plurality of dlls requires modification of the underlying code, it requires some effort by the provider of a product to either increase or decrease the dlls used in order to provide that product.

SUMMARY OF THE INVENTION

The present invention discloses a new structure for a library which registers the functions which it contains with a library manager and which is a combination of a plurality of other libraries (sub-libraries). The structure is such that the effort required to add a new sub-library to the library, or remove an existing sub-library from the library, is reduced when compared to the prior art. Further, in cases where, for example, two sub-libraries of a library each contain a function of the same name, the amount of storage overhead introduced into the library to allow for this situation is reduced. The new structure further results in a new procedure by which a library registers with a library manager.

Accordingly, according to a first aspect the present invention provides a method comprising: receiving, at a library, a request to register the library with a library manager, the library comprising at plurality of sub-libraries, each sub-library comprising one or more executable software functions and having an associated register function; in response to the request, calling the associated register function of each of the plurality of sub-libraries; and in response to a register function being called, registering, with the library manager, details of the one or more executable software functions which the sub-library associated with the register function called comprises.

According to a second aspect the present invention provides a data processing system comprising: at least one processor; and memory accessible to the at least one processor; wherein the data processing system is configured for the at least one processor to perform the sub-processes of: receiving, at a library, a request to register the library with a library manager, the library comprising at plurality of sub-libraries, each sub-library comprising one or more executable software functions and having an associated register function; responsive to the request, calling the associated register function of each of the plurality of sub-libraries; and responsive to a register function being called, registering, with the library manager, details of the one or more functions which the sub-library associated with the register function called comprises.

According to a third aspect the present invention provides a computer program product comprising a computer useable medium having a computer readable program, wherein the computer readable program when executed on a computer causes the computer to perform a method comprising: receiving, at a library, a request to register the library with a library manager, the library comprising at plurality of sub-libraries, each sub-library comprising one or more executable software functions and having an associated register function; in response to the request, calling the associated register function of each of the plurality of sub-libraries; and responsive to a register function being called, registering, with the library manager, details of the one or more functions which the sub-library associated with the register function called comprises.

As a result each sub-library of the library can register with the library manager in the same way whether it is one of a plurality of sub-libraries in a library or a separate independent library. Advantageously this enables a sub-library to be easily added or removed from a library because the same register function can be used for the sub-library whether it is part of the library or a separate independent library. Accordingly, preferably the register function of each sub-library is unaware that the sub-library is one of a plurality of sub-libraries.

This is particularly advantageous when two sub-libraries each contain a function with a common name, because each sub-library registers separately with the library manager. As a result the library manager receives registration details of both commonly named functions and may call either directly.

Optionally when registering the functions of a sub-library with the library manager the registration call to the library manager includes details of the one or more functions in the sub-library and an indication, for example a name, which can be used to identify the sub-library. This provides the library manager with an easy way of distinguishing between functions of different sub-libraries.

For example the library manger is a plug-in library manager and the library is a plug-in library.

BRIEF DESCRIPTION OF THE DRAWINGS

Some of the purposes of the invention having been stated, others will appear as the description proceeds, when taken in connection with the accompanying drawings, in which.

DETAILED DESCRIPTION OF THE ILLUSTRATED EMBODIMENTS

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 1:
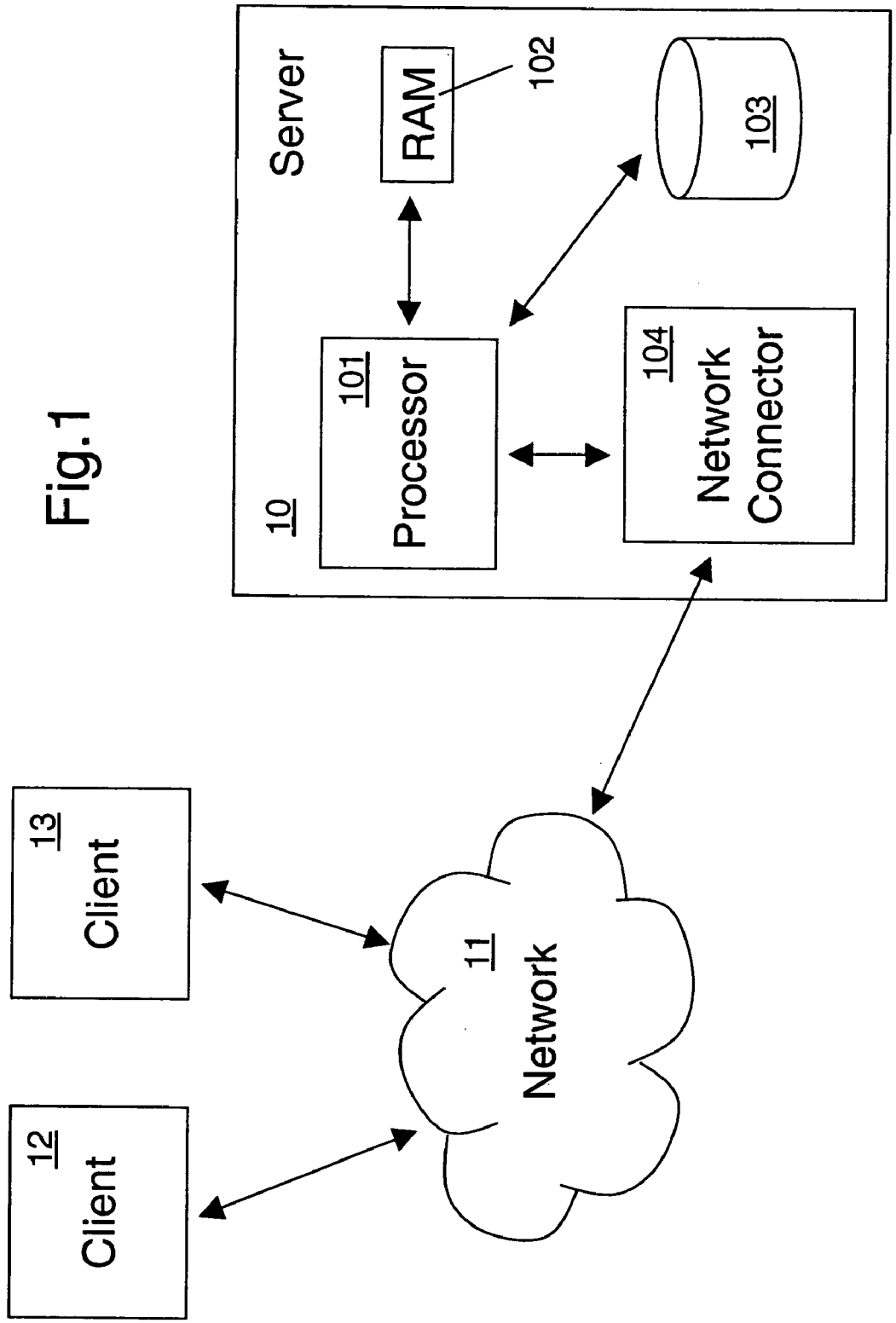
FIG. 1 is a block diagram of an example data processing environment in which the preferred embodiment of the present invention could be advantageously applied.
Figure 3:
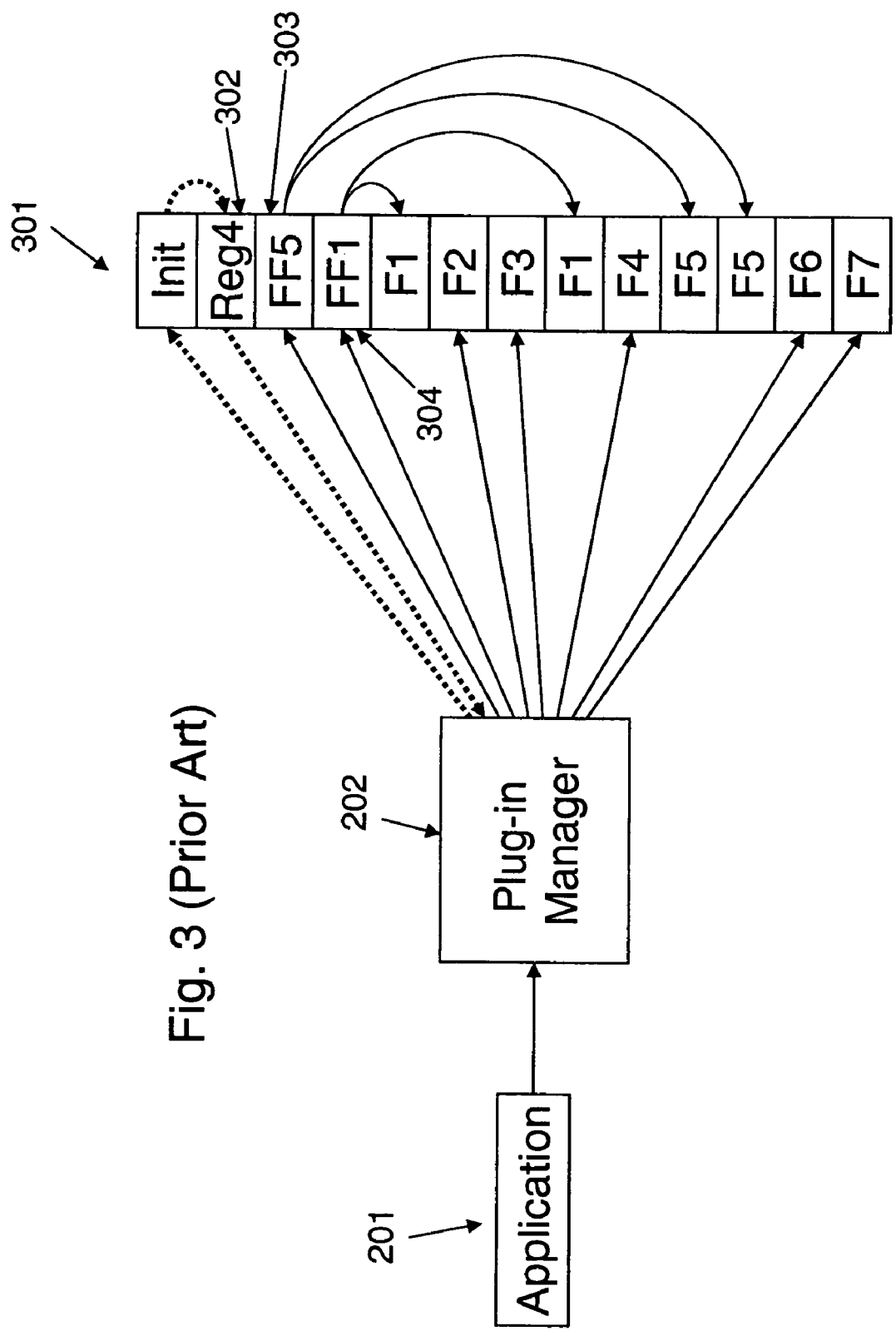
FIG. 3 is a schematic diagram of the plurality of plug-in libraries of FIG. 2 combined into a single plug-in library, and the interactions of the single plug-in library with the library manager, according to the prior art.

FIG. 1 is a block diagram of an example data processing environment in which the preferred embodiment of the present invention could be advantageously applied. In FIGS. 1, 3 data processing systems comprising server 10 and clients 12 and 13 are connected via network 11. Server 10 comprises one or more processors 101 for executing programs that control the operation of the server 10, a RAM volatile memory element 102, a non-volatile memory 103, and a network connector 104 for connecting to the network. For example, server 10 may have program instruction code in non-volatile memory 103 to carry out a method of the preferred embodiment of the present invention, execution of such program instruction code being performed as one or more sub-processes by one or more processors 101 and involving use to RAM volatile memory element 102. Note clients 12 and 13 may comprise similar components to those of server 10 but these are not shown.

Figure 2:
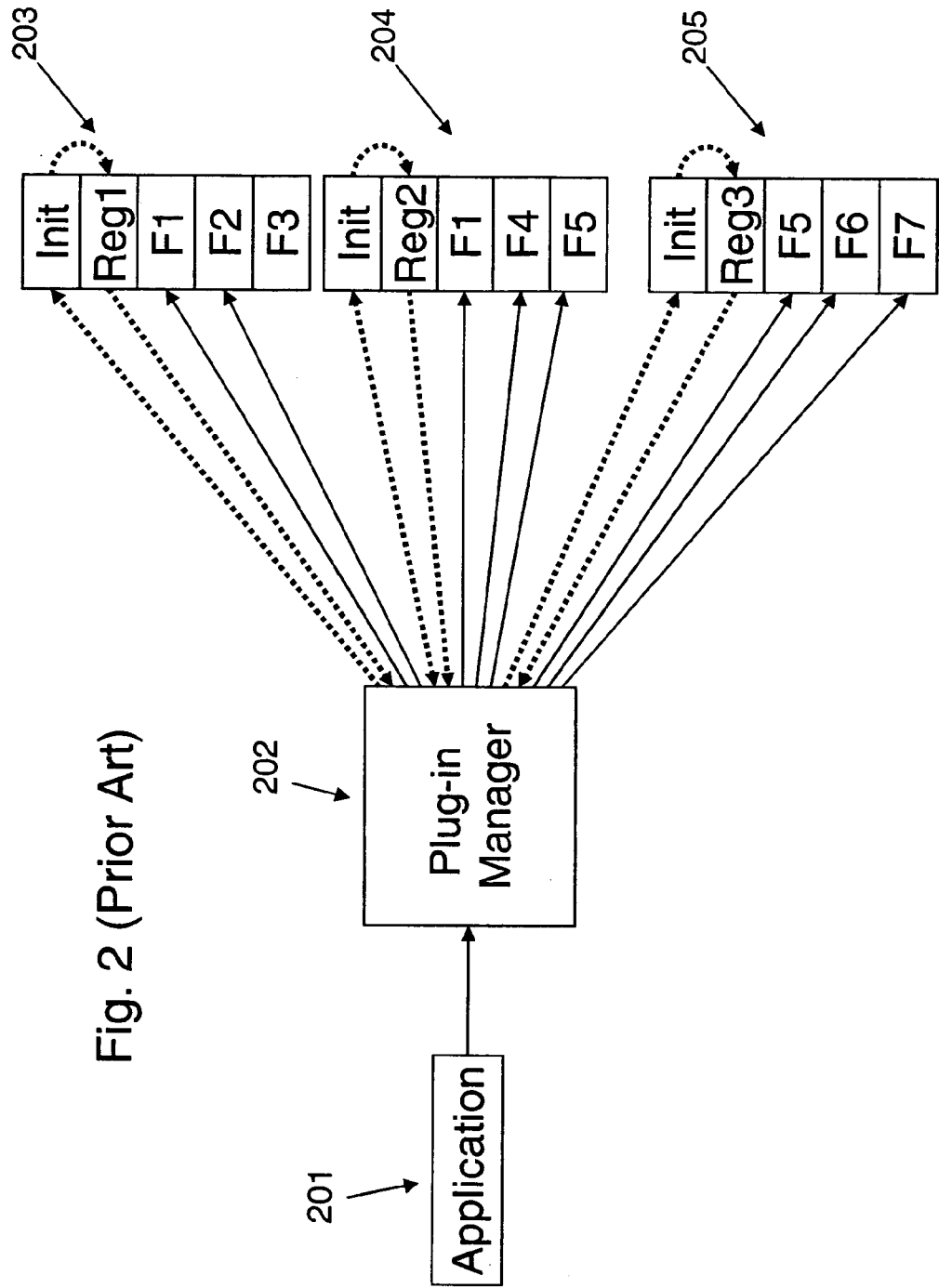
FIG. 2 is a schematic diagram of a plurality of plug-in libraries, and their interactions with a plug-in library manager, according to the prior art.
Figure 4:
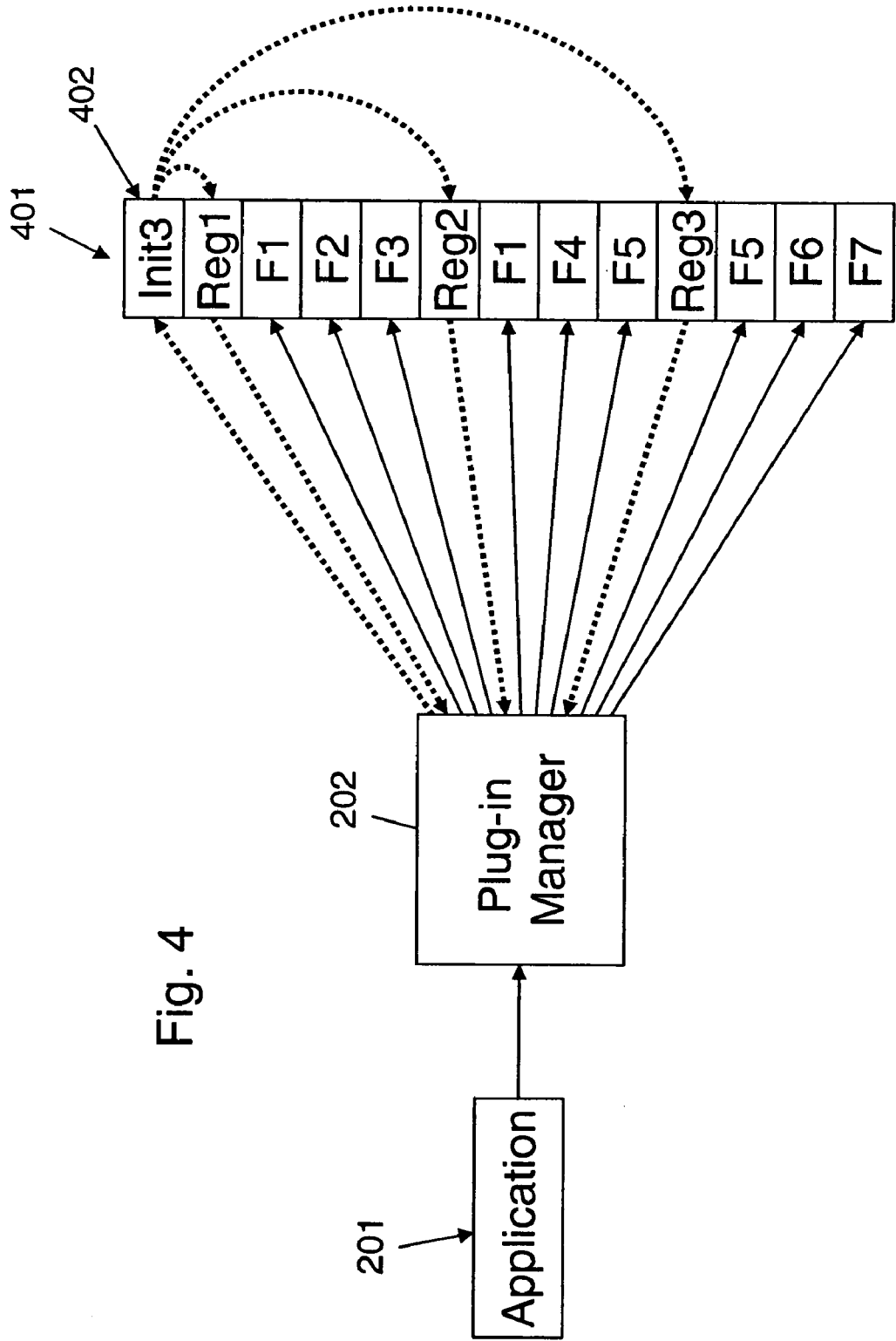
FIG. 4 is a schematic diagram of the plurality of plug-in libraries of FIG. 2 combined into a single plug-in library, and the interactions of the single plug-in library with the library manager, according to the preferred embodiment of the present invention.

FIGS. 2, 3 and 4 are schematic diagrams which show the interactions of a plug-in manager with one or more plug-in libraries. Note that in these figures the interactions which are shown using dotted lines are initialization interactions, whereas interactions shown using solid lines are post-initialization/runtime interactions.

FIG. 2 is a schematic diagram of a plurality of three plug-in libraries 203, 204, 205, and their interactions with a plug-in library manager 202, according to the prior art. Each plug-in library 203, 204, 205 comprises an initialization (Init) function, a register (Reg) function, and various application usable functions F1-F7. The initialization (Init) function is common to all plug-in libraries irrespective of the content of the library and results in a common storage overhead associated with each library. The register functions REG1, REG2, REG3 for libraries 203, 204, 205 respectively, comprise some code which is common to each, and other code which is different to each depending on the functions contained in the library. As a result, the register (Reg) function also results in a storage overhead associated with each library, some of being common to all libraries and the remainder varying in size according to the number and complexity of functions provided in the library.

During initialization application 201 calls plug-in manager 202 to find and access libraries, such as libraries 203, 204, 205. In response, the plug-in manager looks for suitable plug-in libraries and when it locates one, calls the plug-in library's initialization function, the call including an address of a plug-in manager registration function. The initialization function, as part of its processing, calls its associated register function, forwarding the address of the plug-in manager registration function. The register function then passes details of the application available functions in the library to the plug-in manager by calling the plug-in manager registration function. For example library 203, register function REG1 provides details of function F1, F2 and F3 to the plug-in manager. For example the details may comprise a data-structure which provides the address and acceptable parameters of each function in a form recognizable to the plug-in manager. This completes the initialization interactions and now enables the plug-in manager to call the application available functions directly as and when needed during runtime.

However, note that a library may include one or more functions each with a name which is common to a function name of one or more other libraries. For example two or more libraries may each provide a GetData( ) function which returns data specific to the library which provides it. Such a situation can be common, for example, where two libraries provide a suite of functions which are part of a standardized interface. In this situation the plug-in manager must enable an application to direct a call to a function of a particular library.

For example, with reference to FIG. 2, both library 203 and library 204 include an F1 function and as a result the plug-in manager 202 must enable application 201 to direct a call to the F1 function of either library. There are several methods that a plug-in manager may implement to enable this. For example, in one method the plug-in manager provides the application with a different unique name for each occurrence of a duplicate function name. Now, when the application directs a call to a function using one of the different unique names, the plug-in manager routes the call to the associated instance of the commonly named function. For example, in another method the plug-in manager provides the application with different names for all functions of a library by including the name of the library in each different name. For example, with reference to FIG. 2, plug-in manager 202 may provide application 201 with the names "203F1", "203F2", "203F3" as the names for the functions of library 203.

FIG. 2 shows 3 libraries 203, 204, 205. However it may be decided to provide the functions of these 3 libraries in a single library. FIG. 3 is a schematic diagram of the plurality of plug-in libraries of FIG. 2 combined into a single plug-in library 301, and the interactions of the single plug-in library 301 with the plug-in library manager 202, according to the prior art.

The single library 301 contains an initialization function (Init) which is the same as the initialization functions of libraries 203, 204, 205 of FIG. 2, and a register (Reg4) function 302, which, in response to a call from the registration function, registers the functions of the single library 301 with the plug-in manager. However, with reference to FIG. 2, libraries 203 and 204 both provide function F1, and libraries 204 and 205 both provide function F5. As a result single library 301 provides two forwarding functions FF5 (303) and FF1 (304) which are registered with the plug-in manager in place of the F1 and F5 functions. Now, for example, when the plug-in manager requires to call an F1 function it calls the FF1 (304) function and includes details which can be used to determine which of the particular F1 function is to be called. For example, an additional argument may be added to the function FF1 for indicating which F1 function is being called. The FF1 (304) function then forwards the call to the appropriate F1 function.

A problem with combining individual libraries into a single library according to the prior art is the amount of programming effort required. For example, with reference to FIGS. 2 and 3, the combination of individual libraries 203, 204, 205 into a single library requires the forwarding functions FF1 (304) and FF5 (304) to be written. Further the register function Reg4 (302) must be written and it is not a simple combination of the register functions Reg1, Reg2 and Reg3 of sub-libraries 203, 204, 205, because new code is required to handle the forwarding functions FF1 (304) and FF5 (305). Further each time another additional library is added to the library the function Reg4 (302) must be updated and potentially more forwarding functions must be written.

Similarly a problem with changing from a single library, such as library 301 of FIG. 3, to a plurality of libraries, such as libraries 203, 204, 205 of FIG. 3, is also the amount programming effort required. For example, register functions Reg1, Reg2, and Reg3 must be written and are not a simple splitting of register function Reg4, because new code is required to handle the F1 and F5 functions in the absence of forwarding functions FF1 and FF5, respectively. Further functions FF1 and FF5 must be removed from the library.

Accordingly, for example, if a software provider decides to change an existing product such that it is provided using either more or less libraries than the existing product, an unwelcome development cost is incurred.

FIG. 4 is a schematic diagram of the plurality of plug-in libraries of FIG. 2 combined into a single plug-in library 401, and the interactions of the single plug-in library 401 with the plug-in library manager 101, according to the preferred embodiment of the present invention. Single library 401 comprises the register (Reg1, Reg2, Reg3) and application functions of each of the plug-in libraries (sub-libraries) of FIG. 2, and a different initialization (Init3) function compared to that of the sub-libraries. During initialization the plug-in manager calls the initialization (Init3) function, the call including an address of a plug-in manager registration function. The initialization function, as part of its processing, then calls the register function of each sub-library, each call including the address of a plug-in manager registration function. Each register function then passes details of the application available functions in the sub-library to the plug-in manager using the address of the plug-in manager registration function. As a result each sub-library appears as a separate dll to the plug-in manager and the problem of having duplicate functions in a single dll is obviated. Thus forwarding functions are not required because each function is called directly by the plug-in manager when required.

Accordingly, the amount of programming effort required to combine a plurality of libraries into a single library is reduced when comparing the prior art solution of FIG. 3 and the preferred embodiment solution of FIG. 4. For example, with reference to FIGS. 2, 3, and 4, the combination of individual libraries 203, 204, 205 into a single library (301,401) requires only a new initialization (Init3) function (402) to be provided according to the preferred embodiment solution. However in the prior art it requires a new register (Reg4) function and new forwarding functions FF1 (304) and FF5 (305) to be provided. Advantageously, in the preferred embodiment solution, the register functions Reg1, Reg2 and Reg 3 are the same whether their associated library is a separate library (as in FIG. 2) or a sub-library of a library containing multiple sub-libraries (as in FIG. 4). Further, because the forwarding functions FF1(304) and FF5(305) are no longer required, the storage overhead of combining libraries into a single library is reduced.

Further it is possible to automate, for example, the creation of the new initialization (Init3) function (402) as part of an automated build process which is used to create an executable version of the library. For example a typical build process comprises two stages: compile and link. In the compile stage a set of source code files which contain an implementation of the functions to be contained in a library are compiled into compiled objects. In the link stage the compiled objects are linked into executable library, and further an initialization (Init) function is added to the library. For example, a makefile may be used to specify, to software which automates a build process (build tool), a list of source code files to include in a library, options for the compile stage for each source code file, and options for the link stage. In such an automated build, according to the preferred embodiment of the present invention, a list of the register functions to be called by the initialization function is included in the makefile. The list is then used by the build tool to include in the executable library an initialization function which includes calls to each of the register functions listed. For example the initialization function may include a table of register functions and code to iterate through the table and call each one.

Figure 5:
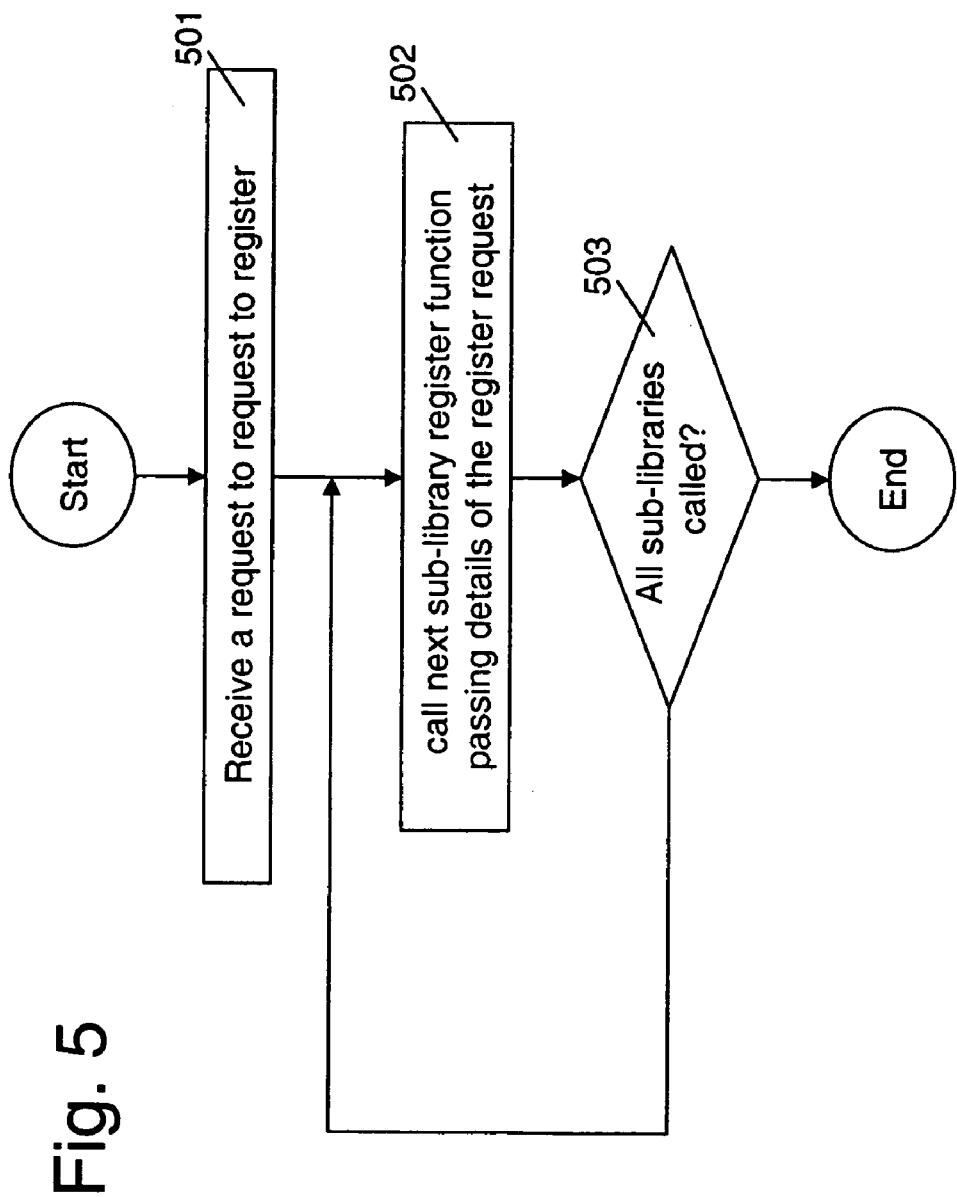
FIG. 5 is a flow chart of the operation of a single plug-in library which comprises a plurality of sub-libraries according to the preferred embodiment of the present invention.

FIG. 5 is a flow chart of the operation of an initialization (Init) function of a single plug-in library which comprises a plurality of sub-libraries, such as pug-in library 401 of FIG. 4, according to the preferred embodiment of the present invention. At step 501 a request is received from a plug-in manager to register the functions of the plug-in library. The request includes an address of a function for the plug-in library to call in order to register the functions it provides. The initialization function then enters a loop, comprising steps 502 and 503, to call the register function of each of the sub-libraries which it contains. At step 502, in the first pass through the loop the register function of a first sub-library is called, and at each subsequent loop the register function of a next different sub-library is called. At step 503 a check is made to see if the register functions of all sub-libraries have been called, and the loop is exited if this condition is met. Note that in an alternative embodiment the loop of steps 502 and 503 may be replaced a sequential list of calls with one call to the registration functions of each sub-library.

Note that the preferred embodiment of the present invention is described in terms of 3 libraries or sub-libraries, each of which contain 3 application functions, and some application functions are common to more than one library/sub-library. However, a skilled person will realize that this is just an example and many variations are possible. For example the invention does not restrict: the number functions in a library/sub-library; the number of libraries/sub-libraries combined into a single library; and the number of duplicate functions amongst the libraries/sub-libraries combined into a single library.

Note that the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

In summary the present invention provides a method, data processing system and computer program product in which a plurality of software executable libraries (sub-libraries) are combined into a single software executable library. The single library comprises a plurality of register functions, each associated with a particular sub-library and each sub-library comprises one or more functions. When the library receives a request to register from a library manager it calls each of the register functions, each of which register the one or more functions of its associated sub-library with the library manager. Advantageously the library manager can subsequently interface with each sub-library as if the sub-library was a standalone library. Further a register function can be used for a library whether the library is sub-library or a standalone library, thereby reducing the effort to switch from one to the other.

What is claimed is:

1. A computer implemented method comprising:
a processor locating a first sub-library and a second sub-library, wherein the first sub-library comprises a first initialization function, a first registration function, and a first plurality of application functions, wherein the second sub-library comprises a second initialization function, a second registration function, and a second plurality of application functions, wherein each initialization function calls an associated register function, wherein each registration function passes details of application functions to a library manager that receives requests for application functions from an application, and wherein each application function is an executable software function that provides additional functionality to a calling application;
the processor combining the first sub-library and the second sub-library into a single library, wherein the single library comprises a new initialization function that replaces the first and second initialization functions, wherein the single library comprises unchanged embodiments of the first and second registration functions, and wherein the single library comprises unchanged embodiments of the first and second plurality of application functions;
the processor directing an application function request for a specific application function from the library manager to the new initialization function, wherein the new initialization function selectively directs the application function request to either the first initialization function or the second initialization function without using a forwarding function, and wherein each sub-library appears as a separate dynamic linked library to the library manager;
the processor detecting a registration request to register the single library with the library manager;

the processor, in response to detecting the registration request, calling the associated register function of each of the first and second sub-libraries; and the processor, in response to a register function being called, registering, with the library manager, details of one or more executable software functions that make up a specific sub-library associated with the register function that is being called.

2. The computer implemented method of claim 1, wherein at least two of the sub-libraries contain a particular function with a common name and the method further comprises:

the processor receiving a request at the particular function of one of the at least two sub-libraries directly from the library manager.

3. The computer implemented method of claim 1 wherein the step of registering details comprises:

the processor calling the library manager and including in the call details of the one or more functions which an associated library comprises and an indication which can be used to identify the associated sub-library.

4. The computer implemented method of claim 1 where in the library manager is a plug-in library manager and the library is a plug-in library.

5. The computer implemented method of claim 1 wherein the register function of each sub-library is unaware that the sub-library is one of a plurality of sub-libraries.

6. The computer implemented method of claim 1, wherein the first sub-library comprises at least one application function that is also located in the second sub-library.

7. A data processing system comprising:

at least one processor; and memory accessible to the at least one processor;

wherein the data processing system is configured for the at least one processor to perform the sub-processes of:

retrieving a first sub-library and a second sub-library, wherein the first sub-library comprises a first initialization function, a first registration function, and a first plurality of application functions, wherein the second sub-library comprises a second initialization function, a second registration function, and a second plurality of application functions, wherein each initialization function calls an associated register function, and wherein each registration function passes details of application functions to a library manager that receives requests for application functions from an application;

combining the first sub-library and the second sub-library into a single library, wherein the single library comprises a new initialization function that replaces the first and second initialization functions, wherein the single library comprises unchanged versions of the first and second registration functions, and wherein the single library comprises unchanged versions of the first and second plurality of application functions;

directing an application function request for a specific application function from the library manager to the new initialization function, wherein the new initialization function selectively directs the application function request to either the first initialization function or the second initialization function without using a forwarding function, and wherein each sub-library appears as a separate dynamic linked library to the library manager;

detecting a registration request to register the single library with the library manager;

responsive to detecting the registration request, calling the associated register function of each of the first and second sub-libraries; and responsive to a register function being called, registering, with the library manager, details of one or more executable software functions that make up a specific sub-library associated with the register function that is being called.

8. The data processing system of claim 7, wherein at least two of the sub-libraries contain a particular function with a common name and the data processing system is configured for the at least one processor to perform the further sub-processes of:

receiving a request at the particular function of one of the at least two sub-libraries directly from the library manager.

9. The data processing system of claim 7 wherein the sub-process of registering details comprises:

calling the library manager and including in the call details of the one or more functions which an associated library comprises and an indication which can be used to identify the associated sub-library.

10. The data processing system of claim 7 where in the library manager is a plug-in library manager and the library is a plug-in library.

11. The data processing system of claim 7 wherein the sub-process, responsive to a register function being called is unaware that the sub-library associated with the function called is one of a plurality of sub-libraries.

12. The data processing system of claim 7, wherein the first sub-library comprises at least one application function that is also located in the second sub-library.

13. A computer program product comprising a computer useable medium having a computer readable program, wherein the computer readable program when executed on a computer causes the computer to perform a method comprising:

identifying a first sub-library and a second sub-library, wherein the first sub-library comprises a first initialization function, a first registration function, and a first plurality of application functions, wherein the second sub-library comprises a second initialization function, a second registration function, and a second plurality of application functions, wherein each initialization function calls an associated register function, wherein each registration function passes details of application functions to a library manager that receives requests for application functions from an application, and wherein each application function is an executable software function that provides additional functionality to a calling application;

combining the first sub-library and the second sub-library into a single library, wherein the single library comprises a new initialization function that replaces the first and second initialization functions, wherein the single library comprises unchanged embodiments of the first and second registration functions, and wherein the single library comprises unchanged embodiments of the first and second plurality of application functions;

directing an application function request for a specific application function from the library manager to the new initialization function, wherein the new initialization function selectively directs the application function request to either the first initialization function or the second initialization function without using a forwarding function, and wherein each sub-library appears as a separate dynamic linked library to the library manager;

detecting a registration request to register the single library with the library manager;

responsive to the registration request, calling the associated register function of each of the first and second sub-libraries; and responsive to a register function being called, registering, with the library manager, details of one or more executable software functions that make up a specific sub-library associated with the register function that is being called.

14. The computer program product of claim 13, wherein at least two of the sub-libraries contain a particular function with a common name and the method further comprises:

receiving a request at the particular function of one of the at least two sub-libraries directly from the library manager.

15. The computer program product of claim 13 wherein the step of registering details comprises:

calling the library manager and including in the call details of the one or more functions which an associated library comprises and an indication which can be used to identify the associated sub-library.

16. The computer program product of claim 13 where in the library manager is a plug-in library manager and the library is a plug-in library.

17. The computer program product of claim 13 wherein the register function of each sub-library is unaware that the sub-library is one of a plurality of sub-libraries.

18. The computer readable storage device of claim 13, wherein the first sub-library comprises at least one application function that is also located in the second sub-library.

* * * * *